United States Patent [19]

Kuo

[11] 4,039,617

[45] Aug. 2, 1977

[54] RECOVERY OF SODA VALUES AND HEAT FROM SODIUM CARBONATE CRYSTALLIZER PURGE LIQUORS

[75] Inventor: Vincent H. S. Kuo, Liverpool, N.Y.

[73] Assignee: Allied Chemical Corporation, Morris Township, N.J.

[21] Appl. No.: 587,583

[22] Filed: June 17, 1975

[51] Int. Cl.$^2$ ............................................. C01D 7/00
[52] U.S. Cl. .................................. 423/186; 23/302 T; 423/206 T; 423/421
[58] Field of Search ................... 423/206 T, 421, 186, 423/184; 23/302 A, 302 T

[56] References Cited

U.S. PATENT DOCUMENTS

| 1,759,361 | 5/1930 | Miller et al. ............................ 23/63 |
| 1,853,275 | 4/1932 | Houghton et al. ....................... 23/63 |
| 1,877,368 | 9/1932 | Seyer ...................................... 423/421 |
| 2,049,249 | 7/1936 | Cunningham .................... 423/206 T |
| 2,161,711 | 6/1939 | Keep et al. .............................. 23/63 |
| 3,498,744 | 3/1970 | Frint et al. ........................ 423/206 T |
| 3,933,977 | 1/1976 | Hardl et al. ........................... 423/421 |

Primary Examiner—O. R. Vertiz
Assistant Examiner—Wayne A. Langel
Attorney, Agent, or Firm—Gerhard H. Fuchs; Anthony J. Stewart

[57] ABSTRACT

Soda values from the crystallizer purge liquor from the process of making sodium carbonate from trona are recovered by cooling the purge liquor to temperature below about 32° C. to effect crystallization of sodium carbonate decahydrate crystals therefrom, and recovering the decahydrate crystals. Optionally, the decahydrate crystals may be heated to convert them to sodium carbonate monohydrate crystals. Sensible heat of the crystallizer purge liquor and/or sensible heat and latent heat of vaporization of the sodium carbonate process crystallizer vapors may be recovered by using it to heat the sodium carbonate decahydrate crystals to convert them to sodium carbonate monohydrate crystals.

11 Claims, 2 Drawing Figures

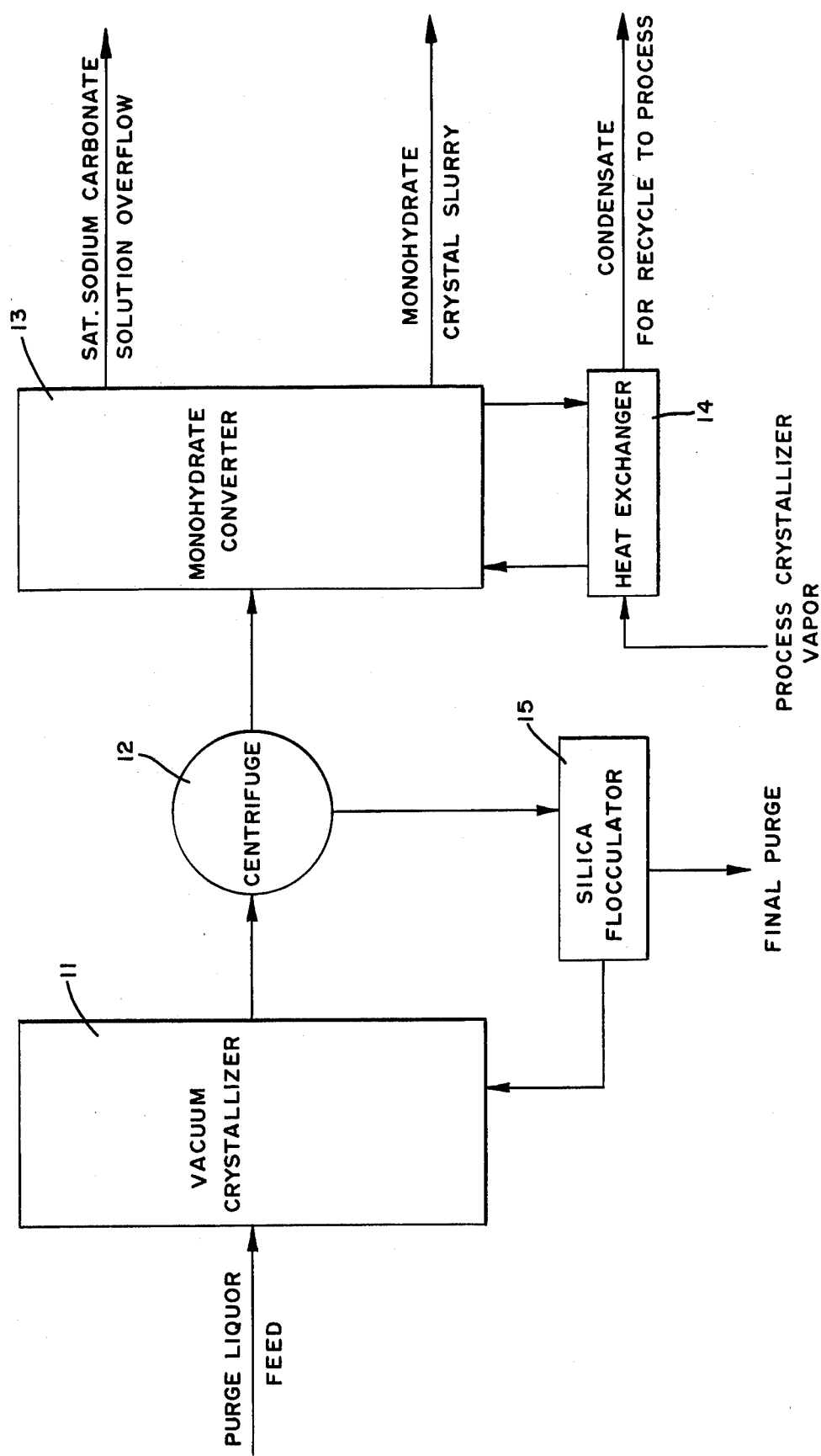

RECOVERY OF SODA VALUES AND HEAT FROM SODIUM CARBONATE CRYSTALLIZER PURGE LIQUORS

BACKGROUND OF THE INVENTION

Trona deposits in Wyoming consist mainly of sodium sesquicarbonate ($Na_2CO_3 \cdot NaHCO_3 \cdot 2H_2O$) containing about 3 to 15 percent or, more generally, 5 to 10 percent of insoluble impurities. Principal impurities contained in the trona include silicaceous matter, e.g. quartz, feldspar and clay, as well as carbonaceous matter.

In the production of sodium carbonate from natural trona, it is usual procedure to calcine the trona at elevated temperatures to obtain crude sodium carbonate:

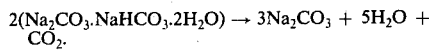

$$2(Na_2CO_3 \cdot NaHCO_3 \cdot 2H_2O) \rightarrow 3Na_2CO_3 + 5H_2O + CO_2.$$

Calcination of the trona effects moisture removal, reduction or elimination of carbonaceous matter, as well as transformation of the sodium sesquicarbonate to sodium carbonate. However, calcination at elevated temperature also causes sodium carbonate to react with silicate contained in the trona to form soluble silicates. In order to avoid rendering large proportions of silicate into water soluble form, it has been proposed to calcine trona at relatively low temperatures in the order of about 150° to 200° C. At these low calcination temperatures, however, relatively large proportions of the carbonaceous matter contained in the trona remain in the calcined trona and contaminate process liquors prepared therefrom. Contamination with carbonaceous matter could be held to a minimum or entirely avoided by conducting calcination at higher temperatures. Unfortunately, however, soluble silicate formation increases with increasing calcination temperatures. Hence, usual operation involves a compromise under which both soluble silicates as well as carbonaceous matter will accumulate in the sodium carbonate crystallizer mother liquors prepared from calcined trona. Additionally, such crystallizer mother liquors will accumulate other impurities, such as chlorides and sulfates. Unless steps are taken to reduce contamination of sodium carbonate crystallizer mother liquors with soluble silicates and carbonaceous matter, as well as with chlorides and sulfates, these contaminants may become significant impurities in the soda ash prepared from such liquors. Carbonaceous matter, if not removed from the sodium carbonate crystallizer mother liquors, not only contaminates the soda ash product; but such carbonaceous matter also includes crystal habit modifiers which adversely modify the crystal structure of the sodium carbonate monohydrate produced by crystallization from the sodium such liquors, and further may cause troublesome foaming of such liquors.

In any event, in the process for making sodium carbonate from trona by the steps of crushing the trona, calcining the crushed trona, dissolving the crushed trona in aqueous medium, generally comprising sodium carbonate crystallizer mother liquor, to obtain sodium carbonate solution, crystallizing sodium carbonate monohydrate crystals from that solution (in apparatus herein referred to as sodium carbonate process crystallizers), followed by separating the sodium carbonate monohydrate crystals and dehydrating them, as by heating, to obtain anhydrous soda ash, it is usual practice to purge a small portion of the sodium carbonate crystallizer mother liquor in order to control contaminants, such as soluble silicates, carbonaceous matter, chlorides and sulfates, within tolerable limits. The sodium carbonate crystallizer mother liquor so purged (hereinafter sometimes referred to as sodium carbonate crystallizer purge liquor, crystallizer purge liquor, or simply purge liquor) generally is committed to waste.

It is an object of the present invention to provide a method for recovering soda values from sodium carbonate crystallizer purge liquor from the process of making soda ash from trona. It is another object of the present invention to provide a method for recovering sensible heat from such sodium carbonate crystallizer purge liquor and/or sensible heat and latent heat of vaporization from the sodium carbonate process crystallizer vapors. It is a further object to recover water from the crystallizer purge liquor in the form of sodium carbonate solution.

SUMMARY OF THE INVENTION

In accordance with the present invention, there is provided a method for recovering soda values from the sodium carbonate crystallizer purge liquor from the process for making sodium carbonate monohydrate crystals which comprises: (a) cooling the crystallizer purge liquor to temperature below about 32° C. to effect crystallization of sodium carbonate decahydrate crystals therefrom, and (b) separating the sodium carbonate decahydrate crystals from the mother liquor. Sodium carbonate decahydrate crystals crystallized from sodium carbonate crystallizer purge liquor from the process of making sodium carbonate monohydrate crystals effectively reject soluble silicates as well as sulfates, chlorides and carbonaceous matter. Hence, the sodium carbonate dechydrate crystals obtained from the crystallizer purge liquor contain appreciable lesser amounts of soluble silicates, sulfates, chlorides and carbonaceous matter than the purge liquor from which they have been crystallized, and the liquor from which these decahydrate crystals have been crystallized will be correspondingly enriched in these impurities. The mother liquor from which the decahydrate crystals have been crystallized would usually be committed to waste.

In another aspect of my invention, the sodium carbonate decahydrate crystals obtained as described above in the preceding paragraph are then heated to temperature of above about 36° C. but below about 108° C. to convert them into an aqueous slurry of sodium carbonate monohydrate crystals, and sodium carbonate monohydrate crystals are separated from the slurry. These crystals can be dehydrated to obtain anhydrous soda ash of commercially acceptable quality. Generally, sodium carbonate monohydrate crystals thus obtained are of sufficient purity to be fed to a dryer together with the sodium carbonate monohydrate crystals obtained from the sodium carbonate process crystallizers from which the purge liquor had been obtained, for dehydration to form anhydrous soda ash, and the liquid portion of the sodium carbonate monohydrate slurry from which sodium carbonate monohydrate crystals have been obtained is of sufficient purity to be returned to and be combined with the sodium carbonate process crystallizer mother liquor.

In another aspect of the present invention, soda values are recovered from the sodium carbonate crystallizer purge liquor by the process which comprises (a) evaporating water from the purge liquor under reduced pressure, as in a vacuum crystallizer, to cool the purge liquor to temperature below about 32° c. to effect crystallization of sodium carbonate decahydrate crystals therefrom, (b) separating the sodium carbonate decahydrate crystals from the mother liquor, (c) heating the separated sodium carbonate decahydrate crystals to temperature above about 36° but below about 108° C. to convert the sodium carbonate decahydrate crystals into an aqueous slurry of sodium carbonate monohydrate crystals, from which sodium carbonate monohydrate crystals and sodium carbonate mother liquor may be recovered.

In a further aspect of the present invention, sensible heat is recovered from the hot sodium carbonate crystallizer purge liquor, and soda values are recovered therefrom, by the process which comprises: (a) bringing the hot sodium carbonate crystallizer purge liquor from the process for making sodium carbonate monohydrate crystals into indirect heat exchange contact with sodium carbonate decahydrate crystals obtained in step c, below, to cool the purge liquor and to heat the sodium carbonate decahydrate crystals to temperature above about 36° C. but below about 108° C. to convert the sodium carbonate decahydrate crystals into an aqueous slurry of sodium carbonate monohydrate crystals; (b) bringing the cooled purge liquor from step a, above, into indirect heat exchange contact with the mother liquor obtained in step c, below, to further cool the purge liquor; (c) cooling the purge liquor from step b, above, to temperature below about 32° C. to effect crystallization of sodium carbonate decahydrate crystals therefrom, separating the decahydrate crystals from the mother liquor, and bringing the mother liquor into indirect heat exchange contact with cooled purge liquor in step b, above; and (d) bringing the sodium carbonate decahydrate crystals formed in step c, above, into indirect heat exchange contact with the hot purge liquor in step a, above, to obtain an aqueous slurry of sodium carbonate monohydrate crystals in sodium carbonate mother liquor, and recovering sodium carbonate monohydrate crystals and sodium carbonate mother liquor.

As previously stated, the sodium carbonate monohydrate crystals obtained via sodium carbonate decahydrate crystallization and heating of the sodium carbonate decahydrate crystals to transform them into sodium carbonate monohydrate crystals and substantially concentrated sodium carbonate solution are of sufficient purity to be fed to a dryer together with the sodium carbonate monohydrate crystals obtained from the sodium carbonate process crystallizers for dehydration to form soda ash, and the liquor portion of the sodium carbonate monohydrate slurry from which the sodium carbonate monohydrate crystals have been obtained may be returned to and be combined with the sodium carbonate process crystallizer mother liquor. Alternatively, the sodium carbonate decahydrate crystals can be transformed into light soda ash (sodium carbonate having bulk density loose, carefully poured, of less than about 51 lbs. per cubic foot, or having bulk density, vibrated and jarred, of less than about 62 lbs. per cubic foot) which involves drying of the sodium carbonate decahydrate crystals by a two step procedure. In the first step the crystals are dried at low temperature in the order of about 20° to 50° C., in a forced convection type dryer, such as a fluid bed dryer, so that decahydrate crystals convert to powdery monohydrate crystals. In the second step the monohydrate crystals are further dried at temperature in the order of 100° to about 200° C., e.g. in a conventional rotary dryer, to obtain light soda ash.

DESCRIPTION OF THE DRAWINGS

In the attached drawings.

FIG. 2 is a flow diagram of another specific embodiment of the present invention showing a continuous process for crystallizing sodium carbonate decahydrate crystals from the purge liquor in a vacuum crystallizer, and heating the decahydrate crystals to convert them into a slurry of sodium carbonate monohydrate crystals in substantially saturated solution of sodium carbonate, which utilizes sensible heat and latent heat of vaporization of vapors from one or more of the vacuum crystallizers of the sodium carbonate process from which the purge liquor had been obtained to convert the decahydrate crystals into monohydrate crystals.

Figure 1:
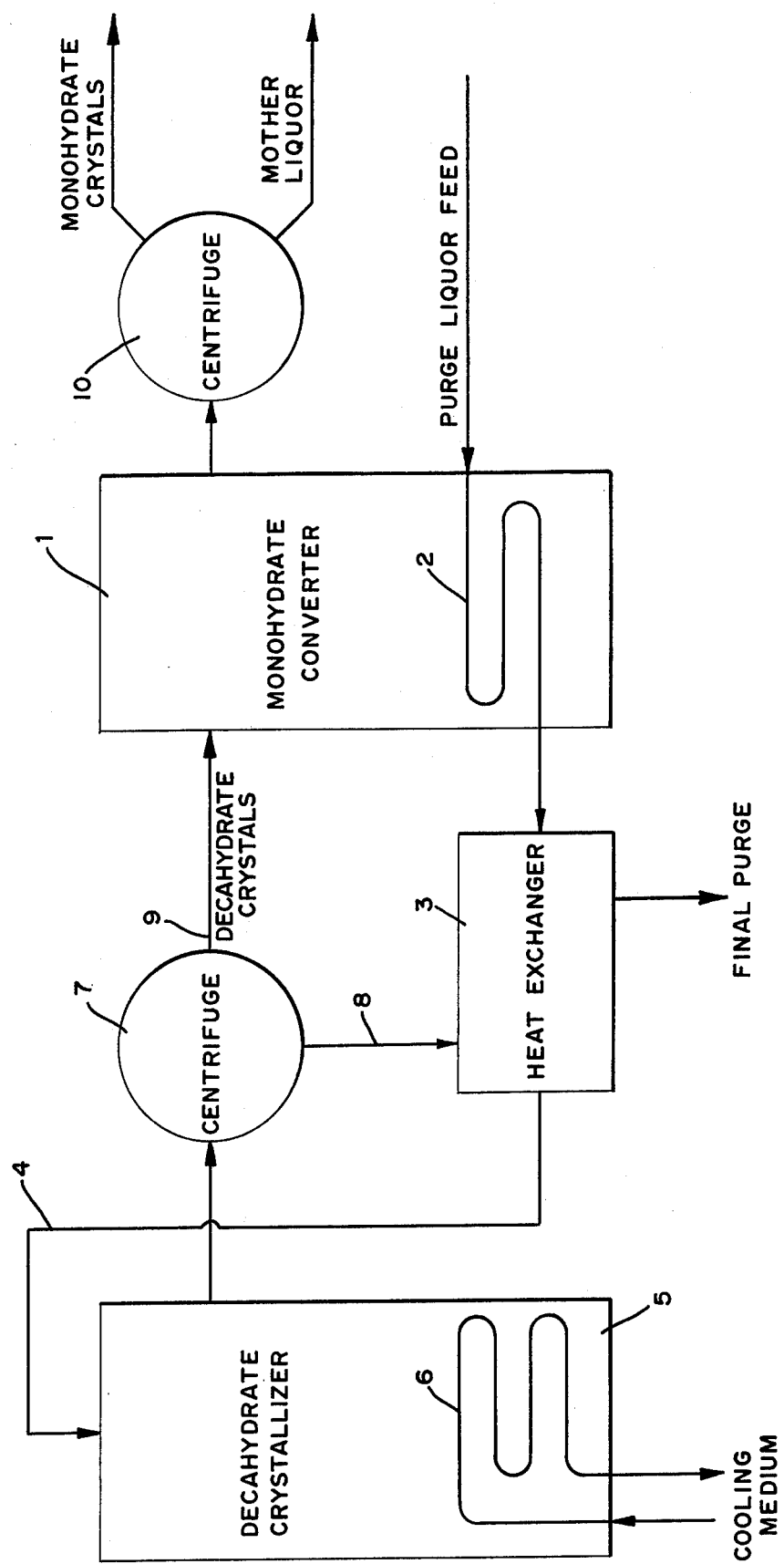
FIG. 1 is a flow diagram of one embodiment of the present invention involving a continuous process for crystallizing sodium carbonate decahydrate crystals from the purge liquor and converting the decahydrate crystals into sodium carbonate monohydrate crystals under recovery of sensible heat from the hot purge liquor.

DETAILED DESCRIPTION OF THE INVENTION, OF THE PREFERRED EMBODIMENTS AND OF THE BEST MODE CONTEMPLATED FOR ITS PRACTICE

With reference to the FIG. 1 of the drawings, equipment employed includes monohydrate converter 1, equipped with heat exchange means 2; heat exchanger 3; decahydrate crystallizer 5, equipped with heat exchange means 6; centrifuge 7 and, optionally, centrifuge 10. The drawing illustrates a continuous process, although the process of the present invention may also be carried out on batch basis, if desired.

Monohydrate converter 1 may be an open vessel, desirably equipped with an agitator or a pump for forced circulation and associated with heat exchange means 2. Heat exchange means 2 may be of any suitable construction such as, for example, plate coils or pipe coils located within monohydrate converter 1, or they may be in the form of external jackets for the vessel or an externally located heat exchanger, e.g. of the shell and tube type.

Decahydrate crystallizer 5 may be any apparatus suitable for effecting crystallization of sodium carbonate decahydrate crystals from the purge liquor, by cooling or, optionally by cooling in combination with evaporation of water from the purge liquor. Decahydrate crystallizer 5 is associated with heat exchange means 6, which may be located internally or externally of decahydrate crystallizer 5. heat exchange means 6 provide indirect heat transfer contact between the slurry in decahydrate crystallizer 5 and a suitable cooling medium, such as refrigerated brine, to cool the mother liquir purge to temperature below about 32° C. In its simplest form, decahydrate crystallizer 5 may comprise an agitator-equipped open vessel, equipped with cooling coils through which refrigerated brine is circulated. Other types of crystallizers are available, and are suitable for present purposes. In any event, however, the chosen apparatus must be capable of cooling the purge liquor to below about 32° C. or else the crystals formed in the mother liquor purge will not be decahydrate crystals. Heat exchange means 6 may be of any conventional design, and may comprise cooling pipes or pipe coils, plate coils, a jacket for decahydrate crystallizer 5, an externally located heat exchanger of the shell and tube type, if desired, or the like.

Centrifuges 7 and 10, of conventional design, are means for separating crystals and mother liquor. A settling tank may be substituted for centrifuge 10. Heat exchanger 3 is likewise of conventional design, for example of the shell and tube type.

The apparatus for carrying out the process of my invention may be constructed of any suitable material, such as steel or stainless steel. Design and construction of the apparatus is within the capability of any competent worker skilled in the art.

With respect to the sodium carbonate decahydrate crystallization step of any embodiment of my invention, and the folowing monohydrate conversion step, the purge liquor must be cooled to temperature below about 32° C., desirably to between about 0° and 30° C., preferably about 10° and 30° C., and, more preferably yet, between about 18° and 30° C.; and the sodium carbonate decahydrate crystals must be heated to temperature above about 36° but below about 108° C., desirably to temperature between about 45° and 108° C., preferably between about 60° and 108° C. In the sodium carbonate decahydrate crystallization step avoidance of temperatures below about 18° C. will often avoid co-precipitation of undesirable silicaceous matter.

In operation of the embodiment shown in FIG. 1, hot purge liquor from the process for making sodium carbonate monohydrate crystals is brought into indirect heat exchange with slurry of sodium carbonate monohydrate in substantially saturated sodium carbonate solution in monohydrate converter 1 by passing the purge through heat exchange means 2. Cold sodium carbonate decahydrate crystals (temperature below about 32° C.) obtained in decahydrate crystallizer 5 are continuously fed into monohydrate converter 1, wherein these crystals are heated in indirect heat exchange with the hot crystallizer purge liquor to convert the decahydrate crystals into sodium carbonate monohydrate crystals and saturated sodium carbonate solution. The now partially cooled crystallizer purge liquor is then passed through heat exchanger 3 in indirect heat exchange with liquid effluent from centrifuge 7 which separates the sodium carbonate decahydrate crystals formed in decahydrate crystallizer 5 from their mother liquor. Mother liquor effluent from centrifuge 7 is passed through line 8 into indirect heat exchange with the partially cooled sodium carbonate crystallizer purge in heat exchanger 3. From heat exchanger 3 the purge liquor is introduced into decahydrate crystallizer 5, wherein it is cooled to temperature below about 32° C. by means of cooling medium circulated through heat exchange means 6, to effect crystallization of sodium carbonate decahydrate crystals therefrom. Sodium carbonate decahydrate crystal slurry is continuously withdrawn from sodium carbonate decahydrate crystallizer 5, crystals and liquor are separated in centrifuge 7, and the separated sodium carbonate decahydrate crystals are fed to monohydrate converter 1. Effluent from centrifuge 7, after passage through heat exchanger 3, is committed to final purge and discarded. Sodium carbonate monohydrate crystal slurry is continuously withdrawn from monohydrate converter 1, and is separated into crystal and liquid phase in centrifuge 10, for which a settling tank or any other means suitable for separating crystals from their mother liquor may be substituted. The sodium carbonate monohydrate crystals are of sufficient purity to be dehydrated to form soda ash of acceptable commercial quality. The mother liquor effluent from centrifuge 10 is of sufficient purity to be returned to the sodium carbonate process crystallizers. To that end, complete separation of monohydrate crystals and mother liquor is not required so that relatively simple settling means for separating crystals and liquor will usually suffice.

In a specific application, 150 gpm. of sodium carbonate purge liquor from the process for making sodium carbonate monohydrate crystals having temperature of about 100° C. are passed through heat exchange means 2 associated with monohydrate converter 1. The purge liquor contains about 29.1 percent by weight of sodium carbonate, 8,250 ppm of soluble silicates, expressed as $SiO_2$ basis the sodium carbonate and 2,560 ppm of organic matter, expressed as carbon basis the sodium carbonate. The temperature of the purge liquor exiting from heat exchange means 2 to is about 49° C. It is then passed through heat exchanger 3, wherein it is cooled to about 37° C., at which temperature it is introduced into decahydrate crystallizer 5 containing a slurry of sodium decahydrate crystals maintained at temperature of about 20° C. by indirect cooling by circulating a cooling medium, (e.g., refrigerated brine) through heat exchange means 6 associated with decahydrate crystallizer 5. Cooling of the purge liquor causes sodium carbonate decahydrate crystals to precipitate therefrom.

Sodium carbonate decahydrate crystal slurry is withdrawn from decahydrate crystallizer 5 at the rate of about 95,600 lbs. per hour, of which about 54,200 lbs. represent relatively pure sodium carbonate decahydrate crystals, the balance comprising sodium carbonate solution heavily laden with impurities. Sodium carbonate decahydrate crystals and the mother liquor from which they have been crystallized are separated in centrifuge 7, and the separated sodium carbonate decahydrate crystals are continuously fed to monohydrate coverter 1 at the rate of about 52,600 lbs. per hour. The sodium carbonate decahydrate crystals in centrifuge 7 are washed with water at the rate of about 10.6 gallons per minute. Liquid effluent from centrifuge 7 amounts to about 78.4 gallons per minute (about 46,700 lbs. per hour, containing about 17.8 percent by weight of sodium carbonate representing about 8,300 lbs. per hour of sodium carbonate). The effluent from centrifuge 7 is passed through heat exchanger 3, wherein it is heated to about 44° C. before being committed to final purge. The effluent committed to final purge contains about 24,000 ppm of soluble silicates, expressed as $SiO_2$ basis sodium carbonate, and about 7,980 ppm of organic matter, expressed as carbon basis the sodium carbonate.

Temperature of the crystal slurry in monohydrate converter 1 is about 44° C., and sodium carbonate decahydrate crystals introduced into monohydrate converter 1 are transformed into sodium carbonate monohydrate crystals and saturated sodium carbonate solution. Sodium carbonate monohydrate crystal slurry is continuously withdrawn from monohydrate counter 1 and separated into sodium carbonate monohydrate crystals and saturated sodium carbonate solution in centrifuge 10. The combined sodium carbonate values recovered in the sodium carbonate monohydrate crystals and the substantially concentrated sodium carbonate solution separated in centrifuge 10 represent about 19,400 lbs. per hour of sodium carbonate. The sodium carbonate monohydrate mother liquor in monohydrate converter 1 contains about 1,020 ppm of soluble silicates, expressed as $SiO_2$ basis the sodium carbonate, and about 113 ppm of organic matter, expressed as carbon basis sodium carbonate. About 70 percent of the sodium carbonate contained in the purge liquor fed to the process is recovered, and about 30 percent of the sodium carbonate contained in the feed is lost in the final purge.

While in above-discussed embodiment illustrated by FIG. 1 of the drawings, sodium carbonate decahydrate crystallization from the purge liquor is effected by means of externally supplied cooling, in below-described embodiment of the present invention illustrated by FIG. 2 sodium carbonate decahydrate crystallization is caused by evaporative cooling in a vacuum crystallizer.

With reference to FIG. 2, equipment employed includes monohydrate converter 13, associated with heat exchanger 14; vacuum crystallizer 11 for crystallizing sodium carbonate decahydrate crystals from the purge liquor; centrifuge 12; and, optionally, silica flocculator 16. Construction of monohydrate converter 13 is like that of above-described monohydrate converter 1 of FIG. 1. Heat exchanger 14 associated with monohydrate converter 13 is illustrated as an externally located heat exchanger, e.g. of the shell and tube type, but it may be of other construction. For example, the heat exchanger serving monohydrate convertor 13 may consist of plate coils or pipe coils located within the monohydrate converter, or it may be in the form of external jackets. Vacuum crystallizer 11 is an evaporative crystallizer wherein cooling of the purge liquor results from evaporation of water therefrom under reduced pressure. It may be designed for batch-wise operation, or, preferably for continuous operation as illustrated. Suitable vacuum crystallizers are commercially available. Vacuum for vacuum crystallizer 11 may be generated by mechanical means, as by pumps or, preferably, by means of a steam ejector discahrging into a barometric condensor. Those skilled in the art are familiar with operation of vacuum crystallizers, and suppliers of vacuum crystallizers will usually be helpful in establishing required design parameters and operating procedures. Centrifuge 12 is of the same or similar design as corresponding centrifuge 7 of FIG. 1.

In the embodiment shown in FIG. 2, the sensible heat of the purge liquor is not used for effecting conversion of sodium carbonate decahydrate crystals to monohydrate crystals, as practiced in the embodiment of FIG. 1. Instead, in FIG. 2 the sensible heat of the purge liquor is utilized in the vacuum crystallizer for evaporation of water therefrom (augmented by heat of crystallization), to simultaneously effect evaporation and cooling of the purge liquor. Hence, the embodiment shown in FIG. 2 utilizes the waste heat from the process crystallizers in the form of vapor withdrawn from these crystallizers to effect heating of the sodium decahydrate crystals in monohydrate converter 13 by means of heat exchanger 14. Other sources of heat may conveniently be substituted therefor.

In a typical trona processing operation to make soda ash, clarified and filtered sodium carbonate liquor obtained by leaching calcined trona is passed in series through a crystallization unit, typically comprising multiple effect evaporative crystallizers (vacuum crystallizers). These crystallizers are herein referred to as "process crystallizers". They are of design similar to that of vacuum crystallizer 11 in FIG. 2. Usually, three process crystallizers are employed, and the feed liquor passes serially through the crystallizers from the crystallizer operated at the highest temperature to the following crystallizers operated at successively lower temperature. As the liquor passes through the crystallizers, a slurry of sodium carbonate monohydrate crystals is formed and passed to each succeeding crystallizer. From the last crystallizer of the series, the crystal slurry, containing about 50 to 60% solids, usually about 30 to 50% solids, is withdrawn and allowed to settle. The sodium carbonate monohydrate crystals are separated from the mother liquor and dried to convert them into soda ash. The mother liquor is recycled to the process, except for that part of the mother liquor which is discarded as purge liquor in order to maintain impurities within the recycled mother liquor at levels sufficiently low to meet soda ash specifications with respect to impurities, e.g. silicate, organics, sulfates, and chlorides. In usual operation, between about 2% and 10%, more generally between about 3% and 5% by weight of the recycled mother liquor is committed to purge in order to maintain product quality. It is that component of the sodium carbonate process liquors which is thus committed to purge which furnishes the purge liquor from which sodium carbonate values are recovered by the present operation. Vapors withdrawn from process crystallizers of the above-described sodium carbonate monohydrate process can be used to heat the sodium carbonate decahydrate crystals to convert them into sodium carbonate monohydrate, as shown in FIG. 2.

In the following descriptions parts and percentages are by weight. In a specific applicationn employing equipment as shown in FIG. 2, purge liquor having temperature of about 103° C. is charged to vacuum crystallizer 11 at the rate of about 1,806 parts per hour. The purge liquor contains about 29.0% of sodium carbonate, 0.51% of sodium sulfate, 0.36% sodium chloride, 0.26% of soluble silicate expressed as $SiO_2$, and 0.065% of carbonaceous matter expressed as carbon. In vacuum crystallizer 11, water is evaporated from the liquor at the rate of about 250 parts per hour. Evaporation is effected by the heat of crystallization liberated together with the flash cooling by virtue of the sensible heat of the feed solution. Slurry containing about 32% sodium carbonate decahydrate crystals having temperature of about 25° C. is withdrawn from vacuum crystallizer 11 at the rate of about 3,795 parts per hour and is routed to centrifuge 12 wherein mother liquor and crystal solids are separated. In centrifuge 12, the crystals are washed with water having temperature of about 25° C. at the rate of about 113 parts per hour. Sodium carbonate decahydrate crystals are withdrawn from centrifuge 12 at the rate of about 1,188 parts per hour, and liquid effluent from centrifuge 12 in amount of about 2,720 parts per hour is routed to silica flocculator 16. Silica flocculator 16 is a relatively large vessel of size sufficient to permit maintenance of the liquid effluent from centrifuge 12 in relatively quiescent condition to permit silicates precipitating from the liquor in the form of floc to settle. Clear overflow liquid from silica flocculator 16 is recycled to vacuum crystallizer 11 at the rate of about 2,239 parts per hour, and underflow liquid containing silicate floc is withdrawn from silica flocculator 16 at a rate of about 481 parts per hour and is committed to final purge. Liquor committed to final purge contains about 21.8% sodium carbonate, about 1.18% sodium sulfate, about 1.31% sodium chloride, about 0.89% silicates expressed as $SiO_2$ and about 0.23% of carbonaceous matter expressed as carbon. Washed sodium carbonate decahydrate crystals obtained in centrifuge 12 are charged to monohydrate converter 13 at the rate of about 1,188 parts per hour. In monohydrate converter 13 the crystals are heated to temperature of about 49° C. by sensible heat and latent heat of evaporation recovered from the vapors from one or more of the process crystallizers in heat exchanger 14 associated with monohydrate converter 13. From monohydrate converter 13 a liquid overflow of concentrated sodium carbonate solution is withdrawn at the rate of about 911 parts per hour, and an underflow of sodium carbonate monohydrate crystals is saturated sodium carbonate solution containing about 30% by weight of crystals is withdrawn at the rate of about 277 parts per hour. The saturated sodium carbonate solution withdrawn from monohydrate converter 13 is recycled to the process crystallizers, and the sodium carbonate slurry is combined with the sodium carbonate monohydrate slurry withdrawn from the process crystallizers for centrifugation. The mass in monohydrate converter 13 contains about 35.3% of sodium carbonate, about 0.30% of sodium sulfate, about 0.02% of sodium chloride, about 0.035% of soluble silicates expressed as $SiO_2$, and about 0.0044% of carbonaceous matter expressed as carbon. Overall recovery of sodium carbonate values from the purge liquor charged to vacuum crystallizer 11 amounts to about 80%.

Since various changes may be made in carrying out the process of my invention without departing from its scope and essential characteristics, all matter contained in the above description shall be interpreted as illustrative only and not in a limiting sense, the scope of my invention be defined by the appended claims.

I claim:

1. The method for recovering soda values from the sodium carbonate crystallizer purge liquor from the process for making sodium carbonate monohydrate crystals by crystallization from a sodium carbonate solution, and recovering sensible heat from the hot purge liquor, which comprises:
   a. bringing the hot purge liquor into indirect heat exchange contact with sodium carbonate decahydrate crystals obtained in step (c), below, to cool the purge liquor and to heat the sodium carbonate decahydrate crystals to temperature above about 36° C. but below about 108° C. to convert the sodium carbonate decahydrate crystals into an aqueous slurry of sodium carbonate monohydrate crystals;
   b. bringing the cooled purge liquor from step (a), above, into indirect heat exchange contact with sodium carbonate decahydrate crystallizer mother liquor obtained in step (c), below, to further cool the purge liquor;
   c. cooling the purge liquor from step (b), above, to temperature below about 32° C. to effect crystallization of sodium carbonate decahydrate crystals therefrom, separating the decahydrate crystals from the mother liquor, and bringing the mother liquor into indirect heat exchange contact with cooled purge liquor in step (b), above; and
   d. bringing the sodium carbonate decahydrate crystals formed in step (c), above, into indirect heat exchange contact with the hot purge liquor in step (a), above, to obtain an aqueous slurry of sodium carbonate monohydrate crystals in sodium carbonate mother liquor, and separately recovering the sodium carbonate monohydrate crystals and the sodium carbonate mother liquor.

2. The method of claim 1 wherin in step (c) the purge liquor is cooled by evaporating water therefrom under reduced pressure to effect crystallization of sodium carbonate decahydrate crystals therefrom.

3. The method of claim 2 wherein in step (c) the purge liquor is cooled to temperature between about 18° and 30° C., and wherein in step (a) the sodium carbonate decahydrate crystals are heated to temperature above about 45° C. but below about 108° C.

4. The method of claim 1 conducted on continuous basis.

5. The method of claim 1 wherein in step (c) the purge liquor is cooled to temperature between about 10° and 30° C. to effect crystallization of sodium carbonate decahydrate crystals therefrom.

6. The method of claim 1 wherein in step (c) the purge liquor is cooled to temperature between about 18° and 30° C. to effect crystallization of sodium carbonate decahydrate crystals therefrom.

7. The method of claim 1 wherein in step (a) the separated sodium carbonate decahydrate crystals obtained in step (c) are heated to temperature above about 45° but below about 108° C. to convert the sodium carbonate decahydrate crystals into an aqueous slurry of sodium carbonate monohydrate crystals.

8. The method of recovering soda values and water in the form of sodium carbonate solution from the sodium carbonate purge liquor from the process for making sodium carbonate monohydrate crystals by crystallization from a sodium carbonate solution, which comprises:
   a. cooling the purge liquor to temperature below about 32° C. to effect crystallization of sodium carbonate decahydrate crystals therefrom;
   b. separating the sodium carbonate decahydrate crystals from the liquor;
   c. heating the separated sodium carbonate decahydrate crystals to temperature above about 36° C., but below about 108° C. to convert the sodium carbonate decahydrate crystals into a slurry of sodium carbonate monohydrate crystals in sodium carbonate solution; and
   d. separately recovering the sodium carbonate monohydrate crystals and the sodium carbonate solution.

9. The method according to claim 8 wherein in step (c) the separated sodium carbonate decahydrate crystals are heated to temperature above about 45° C., but below about 108° C.

10. The method of claim 9 wherein in step (a) the purge liquor is cooled between about 18° and 30° C.

11. The method according to claim 8 wherein in step (a) water is evaporated from the purge liquor under reduced pressure to cool the purge liquor to temperature below about 32° C. to effect crystallization of sodium carbonate decahydrate crystals therefrom.

* * * * *